(12) United States Patent
Smith, II

(10) Patent No.: US 6,873,687 B2
(45) Date of Patent: Mar. 29, 2005

(54) METHOD AND APPARATUS FOR CAPTURING AND RETRIEVING VOICE MESSAGES

(75) Inventor: Donald X. Smith, II, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 427 days.

(21) Appl. No.: 09/949,363

(22) Filed: Sep. 7, 2001

(65) Prior Publication Data

US 2003/0048882 A1 Mar. 13, 2003

(51) Int. Cl.$^7$ ............................................. H04M 1/64
(52) U.S. Cl. ........................ 379/88.14; 379/88.13; 379/910
(58) Field of Search ....................... 379/910, 67.1, 379/88.01, 88.13, 88.14, 88.15, 88.16, 88.17, 88.19, 88.22, 100.13; 704/270

(56) References Cited

U.S. PATENT DOCUMENTS

| | | | |
|---|---|---|---|
| 5,524,137 A | * 6/1996 | Rhee | 379/88.01 |
| 5,651,055 A | 7/1997 | Argade | |
| 5,661,783 A | 8/1997 | Assis | |
| 5,693,693 A | 12/1997 | Auslander et al. | |
| 5,832,063 A | 11/1998 | Vysotsky et al. | |
| 5,838,768 A | * 11/1998 | Sumar et al. | 379/88.14 |
| 5,870,454 A | * 2/1999 | Dahlen | 379/88.14 |
| 5,872,926 A | * 2/1999 | Levac et al. | 709/206 |
| 5,911,776 A | * 6/1999 | Guck | 709/217 |
| 5,929,415 A | 7/1999 | Berson | |
| 5,943,398 A | * 8/1999 | Klein et al. | 379/88.13 |
| 5,987,100 A | * 11/1999 | Fortman et al. | 379/88.14 |
| 5,991,723 A | 11/1999 | Duffin | |
| 6,061,718 A | * 5/2000 | Nelson | 709/206 |
| 6,073,103 A | * 6/2000 | Dunn et al. | 704/276 |
| 6,075,844 A | * 6/2000 | Goldberg et al. | 379/88.17 |
| 6,137,863 A | 10/2000 | Brown et al. | |
| 6,167,376 A | 12/2000 | Ditzik | |
| 6,173,259 B1 | * 1/2001 | Bijl et al. | 704/235 |
| 6,178,230 B1 | 1/2001 | Borland | |
| 6,233,318 B1 | * 5/2001 | Picard et al. | 379/88.17 |
| 6,339,591 B1 | * 1/2002 | Migimatsu | 370/352 |
| 2003/0095643 A1 | * 5/2003 | Fortman et al. | 379/88.14 |
| 2003/0126216 A1 | * 7/2003 | Avila et al. | 709/206 |

FOREIGN PATENT DOCUMENTS

| | | | |
|---|---|---|---|
| DE | 199 56 852 | 5/2001 | |
| EP | 1073290 A2 | * 1/2001 | H04Q/7/22 |
| GB | 2362745 A | * 11/2001 | G10L/15/26 |
| WO | WO 01/89186 A1 | * 11/2001 | |

OTHER PUBLICATIONS

"Introduction to 2D Barcodes," pp. 1–5, www.vishionshape.com.

"INTACTA.CODE™ Technology Explained," Apr. 11, 2001, pp. 1–2, www.intacta.com.

Dragon Naturally Speaking Professional Solutions data sheet (Aug. 6, 2001) ftp://ftp.lhsl.com/naturallyspeaking/datasheets/pro.pdf.

\* cited by examiner

Primary Examiner—Scott L. Weaver

(57) ABSTRACT

An audio messaging system receives audio input and records its contents. The audio input is then converted to a machine-readable representation for later audio playback. The audio input is also converted into a text representation using voice recognition techniques. The machine-readable and text representations are associated with one another and sent to selectable media for retrieval by the intended recipient. By associating the machine-readable representation with the text representation and providing them together, an immediately recognizable text message is provided whose contents can be verified precisely through playback of the machine-readable representation in at least one of a plurality of selectable media formats.

23 Claims, 5 Drawing Sheets

METHOD AND APPARATUS FOR CAPTURING AND RETRIEVING VOICE MESSAGES

FIELD OF THE INVENTION

The present invention relates to the field of telecommunications, and in particular to the automated capture and retrieval of voice messages.

BACKGROUND OF THE INVENTION

Voice messaging systems are well known in the art and take the form of, inter alia, answering machines, voice mail services, and personal computer based software that enables a personal computer to capture and playback telephone messages. Voice messaging systems typically answer an incoming call, play to the caller, a short announcement of the called party, record a caller's message and enable its playback at a later date or time. Prior art voice messaging systems do not provide a printed or "hard copy" of a message, nor do they readily provide for audio messages to be copied or forwarded elsewhere.

Some voice messaging systems use caller identification data that is provided by a carrier to associate an incoming caller's phone number and name with a voice message and, in some systems, to also provide a distinct ring based on the incoming caller's identity. Unfortunately, some telecommunications subscribers do not have "caller ID" available to them, or prefer not to pay for the service. In addition, the use of caller identification technology does not permit these systems to automatically produce a hardcopy of the contents of the message itself (similar to a "While You Were Out" memo).

Other voice messaging systems incorporate voice recognition technology to either initiate a phone call or associate an incoming caller's information, but voice-recognition systems have had only limited success because of technological limitations that are inherent to current voice recognition technology.

Other voice recognition systems associate a digitized version of a voice message with the incoming caller's identity, which is available via "caller ID" data, and allow the creation of a digitized copy of the voice message. An example of such a system is the Digital Secretary, disclosed in U.S. Pat. No. 5,651,055 (Argade; assigned to Lucent Technologies, Inc.). Unfortunately, the digitized copy does not include a human-readable text representation of the message. None of the contents of the message itself are readily accessible by a person in hardcopy form.

A voice message system that provides a printed copy of the message as well as an audio copy of the message would overcome limitations of prior art systems which do not accurately identify callers by voice recognition and cannot accurately transcribe speech into printed text.

SUMMARY OF THE INVENTION

Briefly, the present invention comprises a message capture and retrieval device and method. An audio message is received and recorded. The audio message is encoded into a machine-readable representation and translated into a text representation. The machine-readable representation and the text representation are outputted to at least one storage medium.

BRIEF DESCRIPTION OF THE DRAWINGS

The features of the present invention will be more readily understood from the following detailed description of examples of embodiments thereof when read in conjunction with the accompanying drawings, of which.

DETAILED DESCRIPTION OF THE PREFERRED EMBODIMENT

The present invention provides a method and apparatus for converting a received audio message into both a human-readable text representation and an associated machine-readable representation. The human-readable text representation provides the message in a format that is both easy to read and portable in nature, while the machine-readable representation allows verification of the contents of the human-readable text representation in light of limits to the current state of voice recognition technology. Briefly, a voice messaging system receives an audio input message from, for example, a standard telephone line and records the contents of that audio input message. This audio input message is then converted to associated machine-readable and human-readable text representations, which then may be sent to at least one of a plurality of selectable media for later retrieval by the intended recipient.

Figure 1:
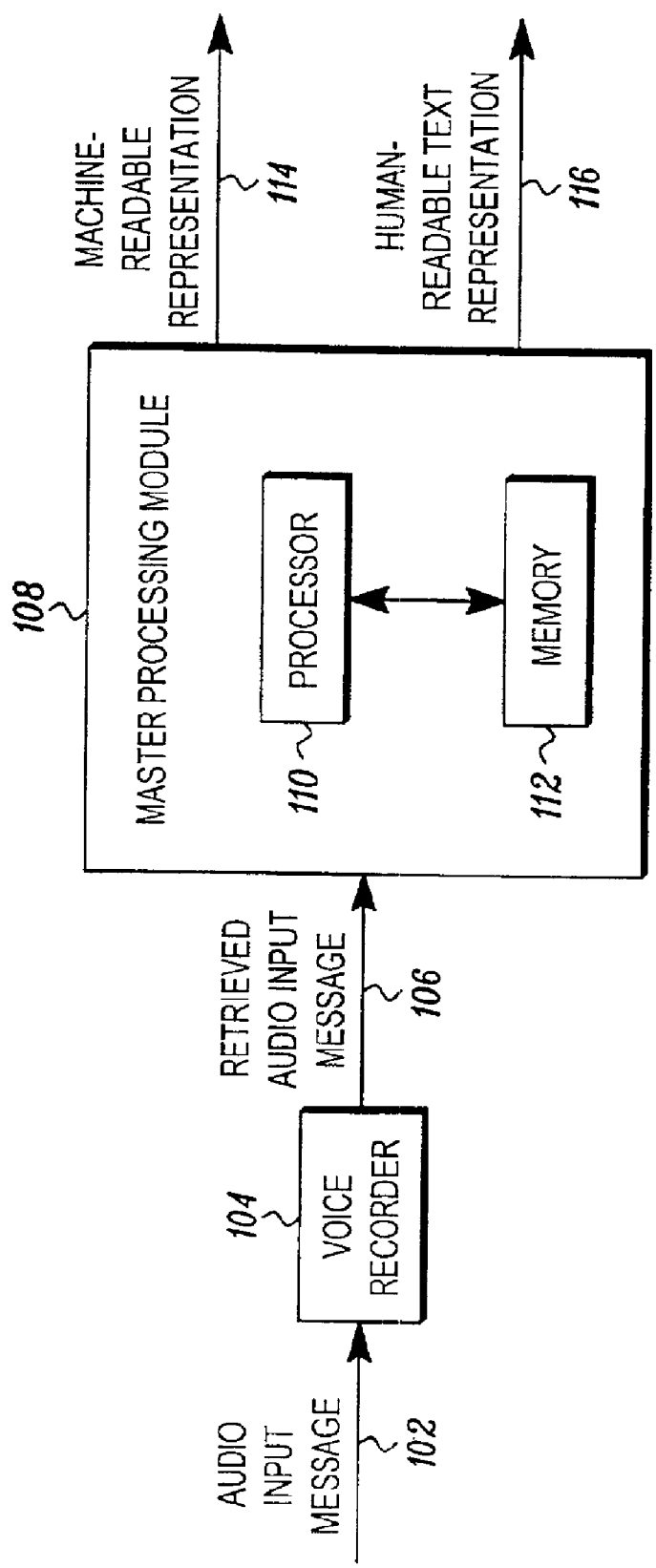
FIG. 1. is a block diagram illustrating an embodiment of a voice messaging system in accordance with the present invention.

FIG. 1 is a high-level block diagram illustrating a voice messaging system. An audio input message 102 is received by the voice messaging system through a voice recorder 104, which records the audio input message 102. The voice recorder 104 may take at least one of many forms as are ordinarily known in the art, including, but not limited to, telephone answering machines, voice mail messaging systems, and personal computer based firmware, hardware, or software that store messages on tape, magnetic disk or semiconductor memory for retrievable and playback. Likewise, the audio input message 102 may take any form as is appropriate to the particular implementation of the voice recorder used, such as an analog or digital signal received by way of, for example, a phone line or digital communications access line (not shown). As is commonly known in the art, such recorders themselves have an ability to manage the storage and retrieval of messages, including, not by way of limitation but example, audio playback, long term storage, deletion, and forwarding.

The master processing module 108 includes a processor 110 and memory 112 as are ordinarily used in the art, which facilitate management of the operations of the master processing module 108. The processor 110 may be a microprocessor (e.g., "PENTIUM" or "POWER PC"), application-specific integrated circuits (ASIC), Field Programmable Gate Array (FPGA), a digital signal processor, or a microcontroller. The memory 112 may be of any kind known in the art including, but not limited to, read-only memory (ROM), random access memory (RAM), rewritable disk memory, write-once-read-many disk memory (WORM), or electrically erasable programmable ROM (EEPROM). The memory 112 comprises instructions that are executed by the processor, as well as variables. The master processing module 108 retrieves the audio input message 106 and produces both a machine-readable representation 114 and a human-readable text representation 116 of the retrieved audio input message 106. The machine-readable representation 114 and human-readable text representation 116 are then output from the voice messaging system, which will be discussed in more detail below.

Figure 2:
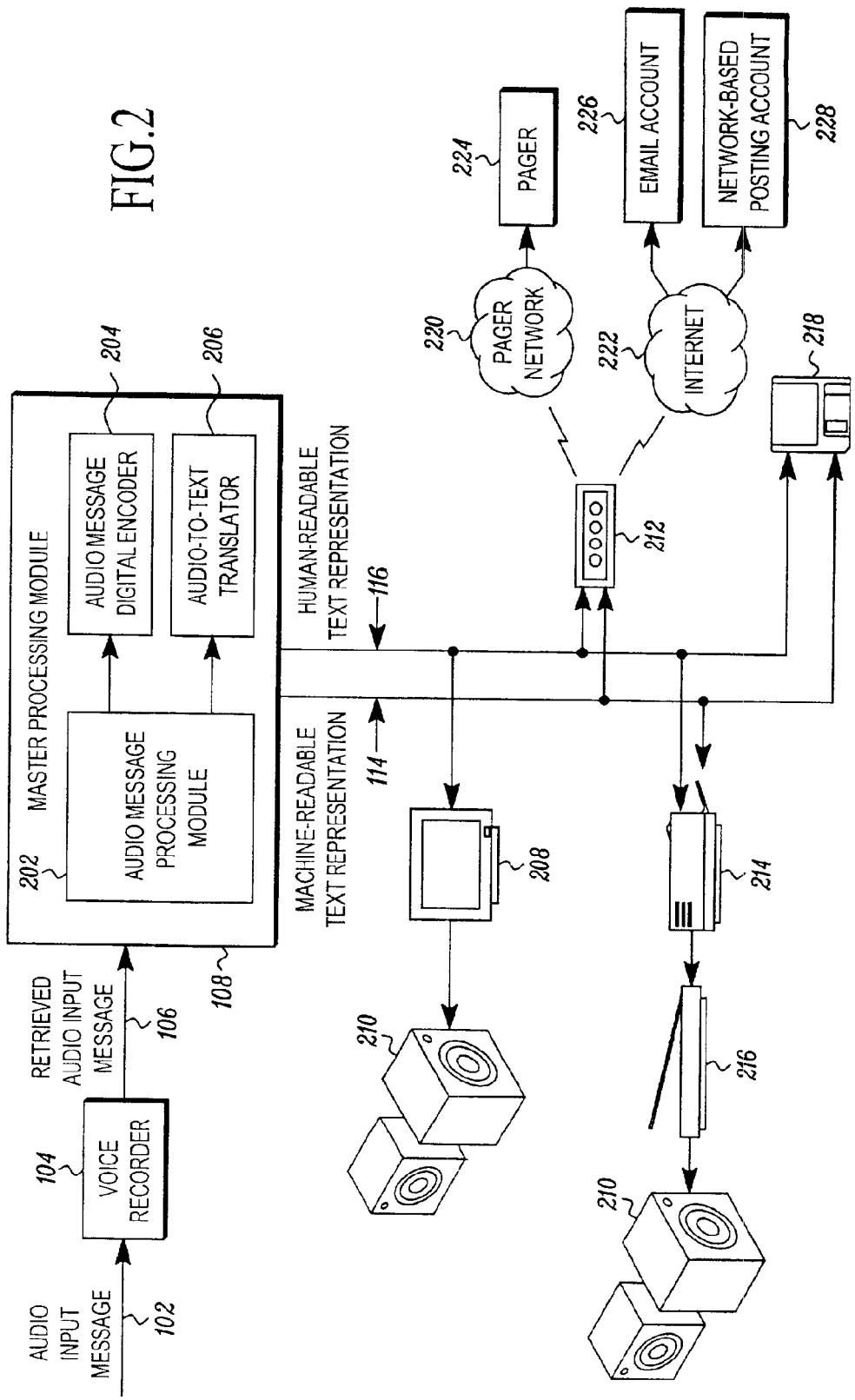
FIG. 2. is a block diagram of a voice messaging system illustrating in greater detail an embodiment of a master processing module and output media in accordance with the present invention.

FIG. 2 is a more detailed block diagram illustrating the master processing module 108 and some of the various forms of selectable media to which the machine-readable representation 114 and human-readable text representation 116 may be sent. The master processing module 108 includes an audio message processing module 202, an audio message digital encoder 204, and an audio-to-text translator 206. The audio message processing module 202 sends the retrieved audio input message 106 to an audio message digital encoder 204 and an audio-to-text translator 206, while retaining a copy within memory 112 for repeated access until deleted. The audio message processing module 202 may also be selectively programmed to process the retrieved audio input message 106 by, inter alia, conditioning it, filtering it, or processing it as is commonly known in the art. In one embodiment, the audio-to-text translator 206 has a limited recognizable vocabulary of enunciated words so as to enable recognition of these words regardless of variations in a speakers accent, inflection and pronunciation. By way of example, a limited vocabulary includes, but is not necessarily limited to, the words for the numbers zero through nine, the phrase "call me," or other common words or phrases that a user selectively adds.

The audio message digital encoder 204 produces a machine-readable representation 114 of the retrieved audio input message 106, albeit after the audio input message has been digitized or otherwise converted into a representation that can be stored and printed. The machine-readable representation 114 of the audio input message 106 can take many forms, which may or may not comply with industry standards at least one of which is a 2-dimensional (2D) bar code or a 3-dimensional (3D) bar code. Two well-known examples of 2D barcode standards are Code 16k and the portable data file (PDF) 417, considered to be at least two of possibly many predetermined-format data file standards. Whereas traditional (i.e., one-dimensional) barcodes typically represent only a unique identifier used to index data in a database, two-dimensional (2D) standards such as Code 16k remove vertical redundancy in the barcode and create multiple layers of horizontal barcode representations, thereby allowing the direct encoding of data in the resulting machine-readable representation 114. Thus, the barcodes can be made to contain all of the data corresponding to an item associated within the barcode itself. The audio message digital encoder 204 can incorporate the well-known technology of a bar code encoding device, such as a barcode printer or software capable of producing an electronic representation of a barcode. The PDF 417 standard is a 2D standard that incorporates advanced error correction in reading a barcode. Yet another standard is Intacta technologies' "INTACTA.CODE" graphical format, which is a patented technique of creating a graphic representation of binary information by way of a small pattern of black and white dots.

The audio message digital encoder 204 can selectively produce a machine-readable representation 114 of the retrieved audio input message 106 in any of these standards. Many other graphical standards are commonly known in the art and may be incorporated into the operation of the audio message digital encoder 204 as well.

The audio-to-text translator 206 uses voice recognition techniques that are well known in the art to produce a human-readable text representation 116 of the retrieved audio input message 106. A library of recognizable utterances (words or phrases) is cross-referenced against the audio message to yield a textual conversion of the audio message. The process performed by the audio-to-text translator 206 can be implemented via software stored within the memory 112 of the audio message processing module 202 but it can also be hardcoded within the audio-to-text translator 206 itself. The audio-to-text translator 206 performs the function of converting the retrieved audio input message 106 into a human-readable text representation 116 that comprises the best approximation of the contents of the message by audio-to-text translator 206.

After the machine-readable representation 114 and the human-readable text representation 116 are created, the master processing module 108 formats and outputs at least one of them to at least one of a plurality of user-selectable media. The media on which the outputs are rendered can be selected manually or programmatically by system software or hardware within the master processing module 108. In one embodiment of the present invention, the machine-readable representation 114 and the human-readable text representation 116 are output to a display device 208, such as a personal computer display, a personal digital assistant (PDA) display, or a television monitor. The human-readable text representation 116 can be seen on the display device 208, and the machine-readable representation 114 can be played back through audio speakers 210 that may be attached to the display device 208, such as the audio speakers that are commonly attached to a personal computer, PDA, or television. In this embodiment, the master processing module 108 can be selectively programmed to convert the machine-readable representation 114 and the human-readable text representation 116 into any format suitable for the particular firmware, hardware, or software that will then display and play them respectively. The machine-readable representation 114 and the human-readable text representation 116 may be retrieved from memory 112 for output to a different media or deleted from memory 112 based on a user's analysis of the message as displayed.

In another embodiment of the present invention, the machine-readable representation 114 and the human-readable text representation 116 are output to a remote data network access device 212, such as a modem (or other remote connection devices that are commonly known in the art (not shown) such as a network interface card, cable modem, etc.). Through devices commonly employed in the art (such as modems and the like), the remote data network access device 212 can transmit the machine-readable representation 114 and the human-readable text representation 116 to various remote locations, such as a pager network 220 or the Internet 222 or other data network (not shown). To this end, such devices preferably assign a global unique identifier ("GUID") to the machine-readable representation 114 and the human-readable text representation 116 to uniquely identify them to the system residing at the destination remote location. The GUID may be used as an index to uniquely identify the message within the remote location in such ways as are well known in the art. If sent to a pager network 220, the machine-readable representation 114 and the human-readable text representation 116 can be sent to a pager 224 as requested by at least one of the settings in the pager network 220 or presettings in the memory 112. If sent to the Internet 222 or other data network, the machine-readable representation 114 and the human-readable text representation 116 can be sent to an email account 226 or a network-based posting account 228 as requested by at least one of the settings in the Internet 222 or other data network or presettings in the memory 112. The network-based posting account 228 can take any form as is commonly known in the art, including but not limited to an HTML-based message board or an HTML-based email account on the World Wide Web. The audio message digital encoder 204 may output the machine-readable representation 114 as a printable image file in one of a number of common graphics file formats, including—by way of example only—.TIF, .JPG, .GIF, and .BMP. The machine-readable representation 114 may also be output as a multimedia graphics file, multimedia audio file in one of a number of common audio file formats, including—by way of example only—.WAV and .MP3.

In yet another embodiment of the present invention, the machine-readable representation 114 and the human-readable text representation 116 are output to a printing device 214 to create a hardcopy of the machine-readable representation 114 and the human-readable text representation 116. When outputting to a printing device 214 available to the voice messaging system for delivery as a hardcopy, the machine-readable representation 114 can be output to the same side of the hardcopy as the human-readable text representation 116, with the human-readable text representation 116 printed to a selectable predefined area. The machine-readable representation 114 can be printed to the other areas of the page, incorporating the machine-readable representation 114 itself into the background design of the hardcopy. The machine-readable representation 114 can also be printed on the opposite side of the hardcopy than that side on which the human-readable text representation 116 is printed. One of ordinary skill in the art would recognize other ways to output the machine-readable representation 114 and human-readable text representation 116 to the same or different sheets of paper, and the present invention is not limited in this regard. In either format, the printed output produces a more useful form of a "While You Were Out" note, being generated automatically and adding to it a machine-readable representation 114 of its text contents. A scanning device 216 suitable for the reading and playing of the machine-readable representation 114 can be used to verify the contents of the human-readable text representation 116 by outputting the contents of the machine-readable representation 114 to attached audio speakers 210.

In yet another embodiment of the present invention, the machine-readable representation 114 and the human-readable text representation 116 are output to other media 218 for transportation to other hardware devices (not shown) that may have the necessary connections to a at least one of a display device 208 and speakers 210; a printing device 214, a scanning device 216, and speakers 210; and a remote network access device 212. The other media 218 may be RAM, EEPROM, rewritable disk memory, tape, or write-once-read-many disk memory. One of ordinary skill in the art would recognize the availability of other media for receiving the machine-readable representation 114 and human-readable text representation 116. For claim construction purposes, such memory is considered to be external memory media.

Figure 3:
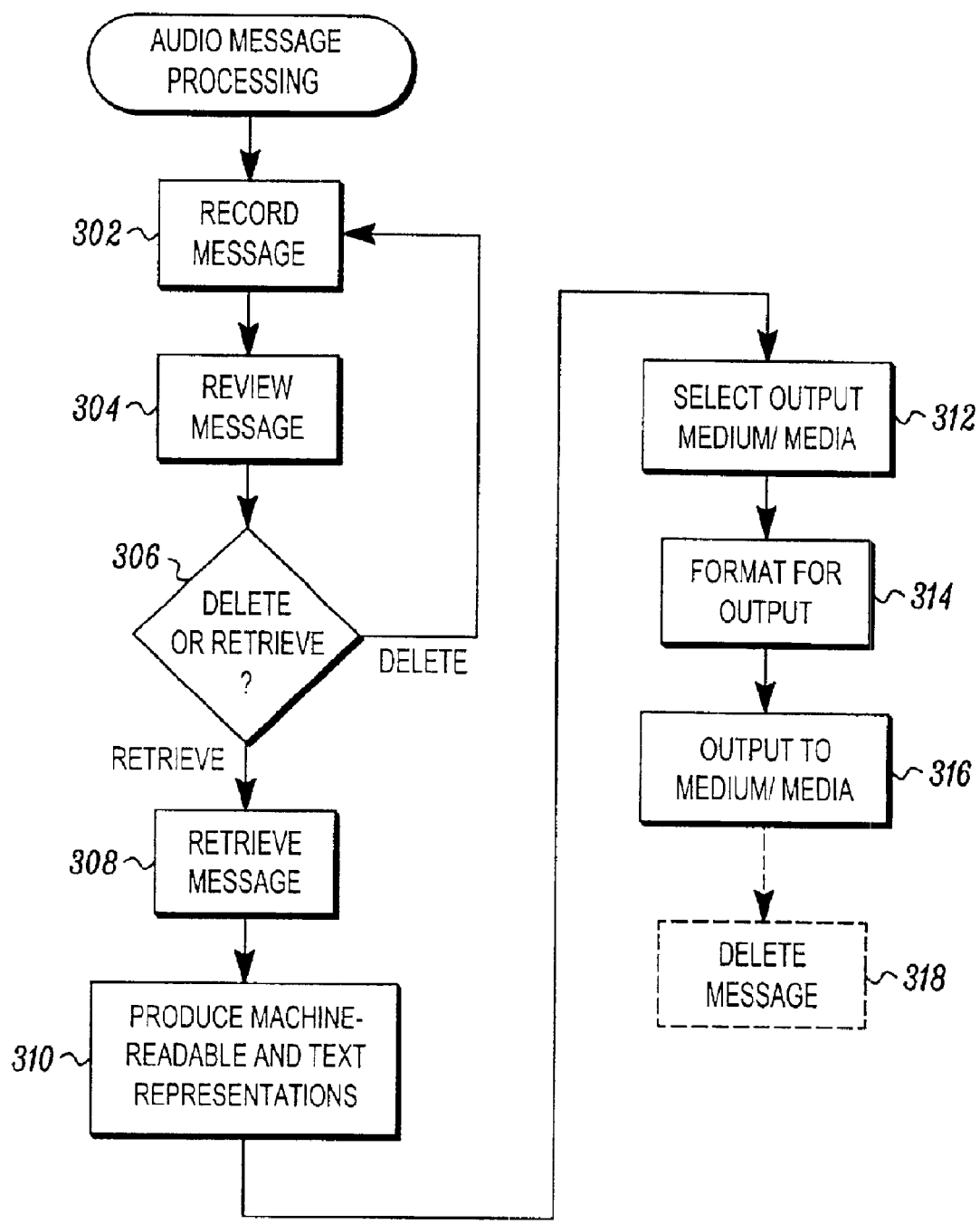
FIG. 3. is a flowchart illustrating the processing of an audio message in accordance with the present invention.

FIG. 3 is a flowchart illustrating how to receive, process, and output an audio message in accordance with the present invention. At step 302, the voice recorder 104 receives and records an audio message as discussed in reference to FIG. 1. At step 304, the voice recorder 104 facilitates review of the audio message. As one of ordinary skill in the art would recognize, such a process is generally manual, selecting to save or discard messages as wanted by way of buttons, switches, and the like. At decision step 306, it is determined whether to delete the recorded audio message or retrieve it for processing. If kept, at step 308 the master processing module 108, and in particular the audio message processing module 202, retrieves the audio message as discussed above in reference to FIG. 2. At step 310, the master processing module 108 produces the machine-readable representation 114 and the human-readable text representation 116 of the audio message. At step 312 the medium or media to which at least one of the machine-readable representation 114 and the human-readable text representation 116 will be output is selected. This selection can be a manual process or programmatic, being performed by firmware, hardware, or software within the master processing module 108. At step 314 the machine-readable representation 114 and the human-readable text representation 116 of the audio message are processed into a format suitable for selective output to at least one of a plurality of available, selectable media. At step 316, the processed representations are output as directed by the commands received from the master processing module 108. Step 318 illustrates an optional deletion of the message from the memory 112 of the master processing module 108 and/or from the voice recorder 104 if, upon review of the audio message on the selected output media, it is determined that the message is no longer needed.

Figure 4:
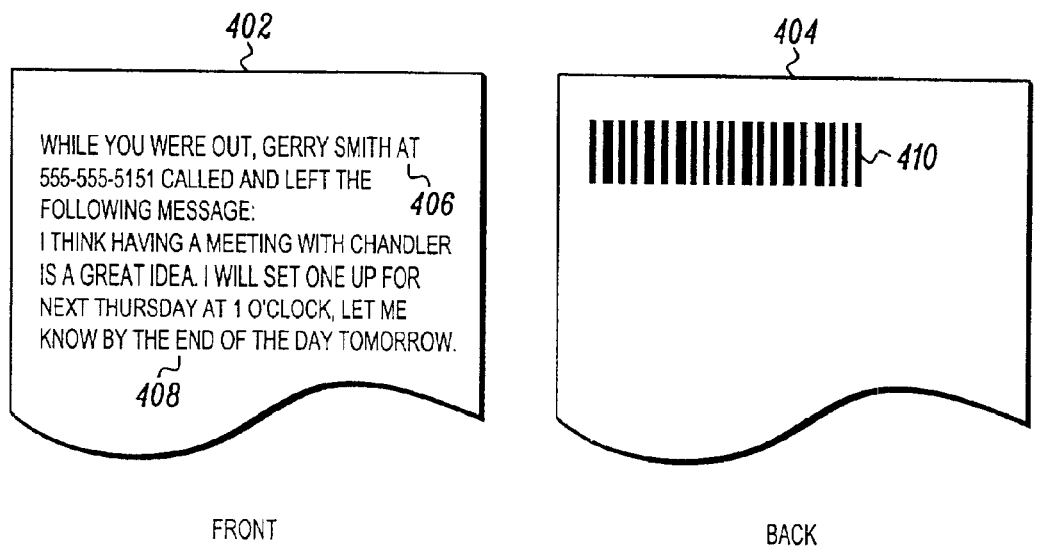
FIG. 4. is a diagram depicting a first embodiment of a machine readable medium in accordance with the present invention.

FIG. 4. is a diagram depicting a first embodiment of a machine readable medium in accordance with the present invention. In this embodiment, the machine-readable representation 114 and the human-readable text representation 116 are sent to a printing device 214, which in turn creates a paper-printout of the message, i.e. a "hardcopy." CALLER ID information 406 (comprising the caller's name, phone number, and surrounding descriptive text) and a human-readable text representation output 408 are placed on the front side of the hardcopy 402, and a machine-readable representation output 410 is placed on the back side of the hardcopy 404. In this embodiment, a one-dimensional barcode format is used for the machine-readable representation output 410. CALLER ID is a telecommunications service well-known in the art provided by both wireless and wireline telecommunications providers that identifies a caller by name and/or telephone number.

Figure 5:
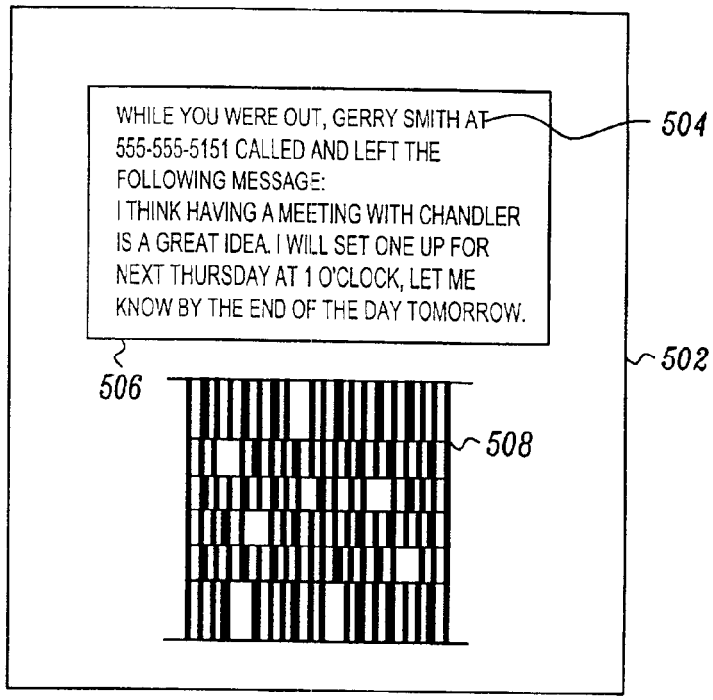
FIG. 5. is a diagram depicting a second embodiment of a machine readable medium in accordance with the present invention.

FIG. 5. is a diagram depicting a second embodiment of a machine readable medium in accordance with the present invention. In this embodiment, the machine-readable representation 114 and the human-readable text representation 116 are sent to a printing device 214, which in turn creates a hardcopy 502 with the output of both representations appearing on the same side of the hardcopy 502. In this embodiment, a two-dimensional (2D) barcode format, according to the Code 16k standard, is used for the machine-readable representation output 508. The CALLER ID information 504 and the human-readable text representation output 506 are printed sequentially in a first area on the hardcopy 502, and the machine-readable representation output 508 is printed in a second area on the hardcopy 502. For example, a layout may be programmed into firmware or software such that, as is illustrated in FIG. 5, the human-readable text representation 116 is printed in its entirety from the top of the hardcopy 502, followed by the machine-readable representation 114 of that message. Alternatively, the software may print a portion of the human-readable text representation 116 from the top of the hardcopy 502, followed by the machine-readable representation 114 of that portion of the message. In this manner, each page of the hardcopy 502 will contain a portion of the human-readable text representation 116 and the machine-readable representation 114 of that portion of the human-readable text representation 116, with successive portions of the human-readable text representation 116 being output to subsequent pages. One of ordinary skill in the art will recognize another example of using well-known watermarking techniques that produce the human-readable text representation 116 on the page, and print the machine-readable representation 114 as a holographic image not easily detected except by a scanning device suitable for such reading. Other embodiments of the machine readable medium would allow a programmatic selection, by way of firmware, software, and/or hardware, of one from a plurality of available layouts.

Figure 6:
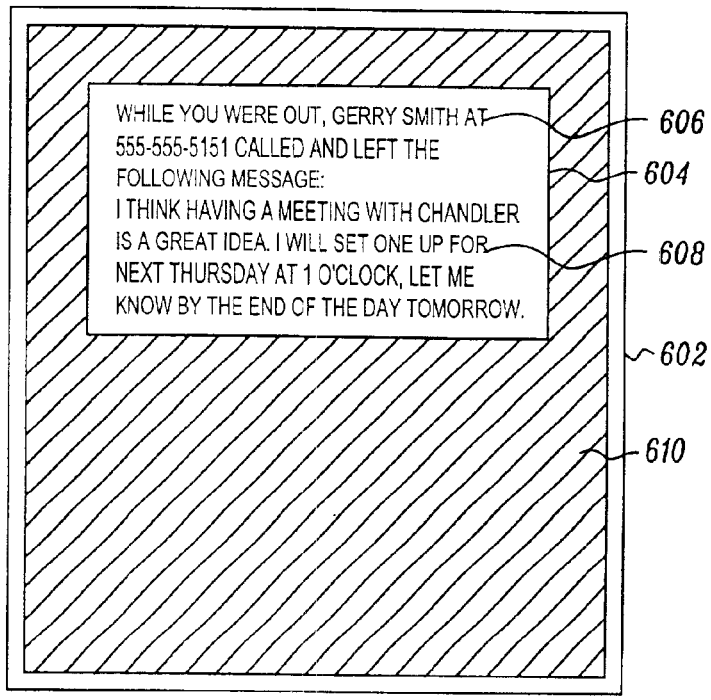
FIG. 6. is a diagram depicting a third embodiment of a machine readable medium in accordance with the present invention.

FIG. 6. is a diagram depicting a third embodiment of a machine readable medium in accordance with the present invention. In this embodiment, the machine-readable representation 114 and the human-readable text representation 116 are sent to a printing device 214, which in turn creates a hardcopy 602 with both representations appearing on the same side of the hardcopy 602. In this embodiment, an "INTACTA.CODE" graphical format is used to render the machine-readable representation of the message. A selectable, predefined area 604 is defined programmatically either in firmware or through a graphical user interface, and the CALLER ID information 606 and human-readable text representation output 608 are printed in that area. The machine-readable representation output 610 is printed outside the selectable, predefined area 604, and is incorporated into a background design of the hardcopy 602. Incorporating the machine-readable representation output 610 into the background design may be done in such a way as to blend the machine-readable representation output 610 into the background design so as to be aesthetically pleasing and/or unapparent to an observer.

Those of ordinary skill in the art will recognize that the present invention makes advances in the area of voice message technology. Archived hardcopy versions of voice messages may be maintained for as long as necessary. An easily readable text transcription is accompanied by a more accurate machine-readable representation of that message. In any of these embodiments, the human-readable text representation 116 may be reviewed as is appropriate to the output technique. If the voice recognition technique has produced a text translation that is in any way questionable, the machine-readable representation 114 may be aurally played to verify the accuracy of the contents of the human-readable text representation 116 (see FIG. 2). This may take many forms including that of playback by scanning a hardcopy of the machine-readable representation 114 or playing the machine-readable representation 114 in the form of a multimedia audio file. The production of the machine-readable representation 114 and its associated human-readable text representation 116 provide easy to read and portable messages, while assuring accurate interpretation of the contents of the message in light of limits to the current state of voice recognition technology.

It should be understood that the implementation of other variations and modifications of the invention in its various aspects will be apparent to those of ordinary skill in the art, and that the invention is not limited by the specific embodiments described. It is therefore contemplated to cover by the present invention, and any and all modifications, variations, or equivalents that fall within the spirit and scope of the basic underlying principles and claimed herein.

I claim:

1. A voice message capture and retrieval method comprising:
    receiving and recording an audio input message;
    encoding the audio input message into a machine-readable representation with a predetermined-format data file standard suitable for bar-code representations;
    translating the audio input message into a text representation; and
    outputting at least one of the machine-readable representation and the text representation to at least one storage medium.

2. The method of claim 1 wherein the machine-readable representation is a graphical representation.

3. The method of claim 1 wherein the step of outputting further comprises transmitting at least one of the machine-readable representation and the text representation through electronic mail.

4. The method of claim 1 wherein the step of outputting further comprises transmitting the at least one of the machine-readable representation and the text representation through a data network.

5. The method of claim 1 wherein the step of outputting further comprises transmitting the at least one of the machine-readable representation and the text representation to a pager network.

6. The method of claim 1 wherein the step of outputting further comprises transmitting the at least one of the machine-readable representation and the text representation to a display device.

7. The method of claim 1 wherein the step of outputting further comprises transmitting the at least one of the machine-readable representation and the text representation to external memory media.

8. The method of claim 1 further including the step of assigning a global unique identifier to the audio input message and the associated machine-readable representation and text representation.

9. The method of claim 1 further comprising:
    receiving CALLER ID information; and
    wherein the step of outputting further comprises outputting the CALLER ID information to the at least one storage medium.

10. The method of claim 2 wherein the step of outputting further comprises transmitting the at least one of the graphical representation and the text representation to a printing device.

11. The method of claim 11 wherein the step of outputting further comprises printing the text representation in a first area and printing the graphical representation in an area excluding the first area.

12. A machine-readable medium having stored thereon at least one of:
    a machine-readable representation of a voice message retrieved from a voice recorder;
    an audio-to text translator that creates a translated text representation of the voice message retrieved from the voice recorder; and an audio signal digital encoder that encodes a predetermined-format data file standard to create bar-code representation of the machine-readable representation.

13. The machine-readable medium of claim 12 further comprises having stored thereon CALLER ID information.

14. The machine-readable medium of claim 12, wherein the machine-readable representation comprises:
a two-dimensional bar-code implemented in a predetermined format data file standard for bar-code representations.

15. The machine-readable medium of claim 12, wherein the machine-readable representation comprises:
a multimedia audio file.

16. The machine-readable medium of claim 12, wherein the machine-readable representation comprises:
a multimedia graphics file.

17. The machine-readable medium of claim 12, wherein
the text representation is printed in a first area; and
the machine-readable representation is printed in an area excluding the first area.

18. A voice message capture and retrieval apparatus comprising:
a voice recorder operably coupled to receive and record audio signals;
an audio signal processing circuit operably coupled to the voice recorder to retrieve the audio signals;
the audio signal processing circuit comprising a processor;
the audio signal processing circuit further comprising memory operably coupled to the processor;
an audio signal digital encoder operably coupled to the audio signal processing circuit to receive the audio signals and encode the audio signals into a machine-readable representation;
an audio-to-text translator operably coupled to the audio signal processing circuit to receive the audio signals and translate the audio signals into a text representation; and
an output port operably coupled:
to receive at least one of the machine-readable representation and the text representation; and
to provide the machine-readable representation and the text representation to at least one output medium.

19. The voice message capture and retrieval device of claim 18 wherein the audio signal digital encoder further comprises a barcode-encoding device.

20. The voice message capture and retrieval device of claim 18 wherein the output port is operably coupled to a remote data network access device.

21. The voice message capture and retrieval device of claim 18 wherein the output port is operably coupled to a display device.

22. The voice message capture and retrieval device of claim 18 wherein the output port is operably coupled to a printing device.

23. The voice message capture and retrieval device of claim 18 wherein the output port is operably coupled to receive CALLER ID information.

* * * * *

UNITED STATES PATENT AND TRADEMARK OFFICE
CERTIFICATE OF CORRECTION

PATENT NO. : 6,873,687 B2
DATED : March 29, 2005
INVENTOR(S) : Smith, II

It is certified that error appears in the above-identified patent and that said Letters Patent is hereby corrected as shown below:

Column 8,
Line 52, delete "claim 11" and insert -- claim 10 --.

Column 10,
Line 12, delete "medium." and insert therefor -- medium, wherein the output port is operably coupled to a scanning device. --.

Signed and Sealed this

Twenty-seventh Day of December, 2005

JON W. DUDAS
*Director of the United States Patent and Trademark Office*